United States Patent [19]
Kaplinsky

[11] Patent Number: 6,114,884
[45] Date of Patent: Sep. 5, 2000

[54] DRIVER CIRCUIT PROVIDING EARLY RELEASE AND QUICK BUS TURN-AROUND

[76] Inventor: Cecil H. Kaplinsky, 140 Melville Ave., Palo Alto, Calif. 94301

[21] Appl. No.: 09/287,446

[22] Filed: Apr. 7, 1999

[51] Int. Cl.[7] .................................................. H03K 3/00
[52] U.S. Cl. ........................... 327/108; 327/374; 326/56; 326/57
[58] Field of Search ........................... 327/108–112, 170, 327/374, 376, 377, 434, 205, 206; 326/56–58

[56] References Cited

U.S. PATENT DOCUMENTS

| | | | |
|---|---|---|---|
| 5,057,711 | 10/1991 | Lee et al. .................................. | 326/58 |
| 5,534,789 | 7/1996 | Ting ......................................... | 326/58 |
| 5,654,648 | 8/1997 | Medhekar et al. ........................ | 326/58 |

*Primary Examiner*—Kenneth B. Wells
*Attorney, Agent, or Firm*—Thomas Schneck

[57] ABSTRACT

In a system of plural bus driver circuits connected to a shared bus line, each of the driver circuits has combinatorial logic responsive, driving a final clock cycle for an active driver, to the difference between the data input and output of a tri-state driver element so as to generate a control signal that maintains the driver element in a active state until the data input and output are identical and then providing early release of the driver element to an inactive state, so that the next driver circuit can be activated at the start of the next clock cycle without conflict.

5 Claims, 3 Drawing Sheets

DRIVER CIRCUIT PROVIDING EARLY RELEASE AND QUICK BUS TURN-AROUND

TECHNICAL FIELD

The present invention relates to tri-state bus driver circuitry for digital integrated circuits, and in particular relates to driver control for avoiding conflicts between different drivers connected to the same data bus.

BACKGROUND ART

FIG. 1 shows plural high speed drivers 11 and 13 on a tri-state data bus 15. To avoid bus conflicts, only one of the drivers may be enabled, and thus have access to the bus, at any one time. Typically, this conflict avoidance is managed by an arbiter circuit 17 responsive to a clock signal CLK so as to provide output enable control signals OE1 and OE2 to the drivers. When one of the output enable control signals goes to a first state (e.g., high), the corresponding driver 11 or 13 becomes active, and data D1 or D2 received at that driver's input is applied at the driver's output to the bus line 15 as a data signal $D1_{out}$ or $D2_{out}$, usually with some current amplification.

When output enable control signals go to a second state (e.g., low), the corresponding drivers are turned off, so that there is a high impedance between those drivers' inputs and outputs. Any data signals received at the inputs to such nonenabled or inactive drivers do not get put onto the bus. Thus it would seem that all that is needed to avoid conflicts would be to ensure that only one output enable signal is in the first state, so that only one driver is active at any one time. However, there is always some delay between transitions of the output enable signals and the change in active/inactive condition of the drivers. Moreover, in CMOS circuits it is typically the case that the drivers tend to turn on faster than they turn off. This is not a problem when the clock rate is sufficiently slow, because then a delay can be provided between switching off one output enable signal from high to low and a subsequent switching of another output enable signal from low to high, thereby compensating for the difference between a driver's turn on and turn off times. But as clock speeds increase this solution has become unworkable.

FIGS. 2A and 2B illustrate the problem. FIG. 2A shows a timing diagram representing the nearly ideal case that is achieved with relatively slow clocks (about 50 MHz or less). FIG. 2B is another timing diagram that shows what normally happens when faster clocks (greater than about 50 MHz) are used. In FIG. 2A, first the output enable control signal OE1 is high so that the first driver 11 in FIG. 1 is active. Thus, data D1 received at that driver's input is applied as an output signal $D1_{out}$ onto the bus line, so that whatever state (high or low) is the output data signal $D1_{out}$, that state is also present on the bus line 15 forming a corresponding bus signal BUS. Next, at a clock edge or transition 19, or almost immediately thereafter, the output enable signal OE1 falls to a low state. This eventually turns the first driver off so that there is a high impedance between its input and output and no data output signal $D1_{out}$ will then be applied by the first driver to the bus. After OE1 has fallen low, but usually with some specified delay, the output enable control signal OE2 rises to a high state. (This may occur prior the first driver completing its turn off provided the second driver doesn't begin to turn on until after the first driver is off.) Again after some delay, the switch in the state of the output enable signal OE2 causes the second driver to turn on. As a result, an output data signal $D2_{out}$ is applied by the second driver to the bus, and the bus signal, BUS, again corresponds to a data signal, in this case $D2_{out}$. The BUS signal thus represents data received successively from the several drivers with a very short interval 23 in which all drivers are momentarily off. However, as seen in FIG. 2B, for faster clock rates it is not always possible to provide an adequate delay between the pull down 25 of one output enable signal OE1 and the pull up 27 of another output enable signal OE2 to compensate for the difference in turn off and turn on times for the drivers. Thus, the second driver may turn on and begin to place its data $D2_{out}$ onto the bus (as seen at 29) before the first driver bus has turned off and thus while it is still providing data $D1_{out}$ to the bus (as seen at 31). Thus, the bus signal BUS may have an interval 33 where two drivers are in conflict and both attempting to place data on the bus. The bus is slow to stabilize because the two drivers are fighting each other, thereby increasing cycle times and slowing down the system. Further, with both driver enabled, there is unnecessarily high power consumption, particularly where one driver is trying to pull the bus up to a high logic state by sourcing current from a power supply line, while the other driver is trying to pull the bus down by sinking current to ground.

To avoid such conflicts, the prior conventional approach when using faster clocks has been to introduce a wait state as seen in FIG. 3. Transitions 35 and 37 in the output enable control signals OE1 and OE2 are separated by one clock cycle. This ensures that an active driver being disabled has sufficient time to turn off before the next driver begins to turn on. Having two drivers partially on is therefore avoided. However, a slow system with less bandwidth results due to the lost cycle.

An object of the invention is to provide a driver circuit that can avoid bus conflicts without losing a clock cycle even when using fast clocks.

SUMMARY OF THE INVENTION

The object is met with a driver circuit constructed to provide early release of the active driver during the last clock cycle for which it has the bus, in preparation for activation of the next driver at the beginning of the next clock cycle. In particular, the output enable control signal that is received by the circuit is withdrawn early, during the clock cycle preceding the one in which the next driver is to be activated, but combinatorial logic receiving feedback from the driver's output side keeps the driver active during this preceding clock cycle as long as the actual bus state is different from the desired state as determined by the data value on the driver's input side. Once the bus has reached the desired state, the combinatorial logic deactivates the driver. The bus has a weak hold latch to maintain its last state during intervals when all drivers are inactive. Because it generally does not take an entire clock cycle to drive the bus to the desired state, the driver will deactivate on its last clock cycle prior to the end of that cycle, instead of having to wait until the beginning of the next cycle. Hence, the next driver can be turned on immediately at the beginning of the cycle without conflict and without needing a wait cycle, because the previous driver is already off.

BEST MODE FOR CARRYING OUT THE INVENTION

Figure 1:
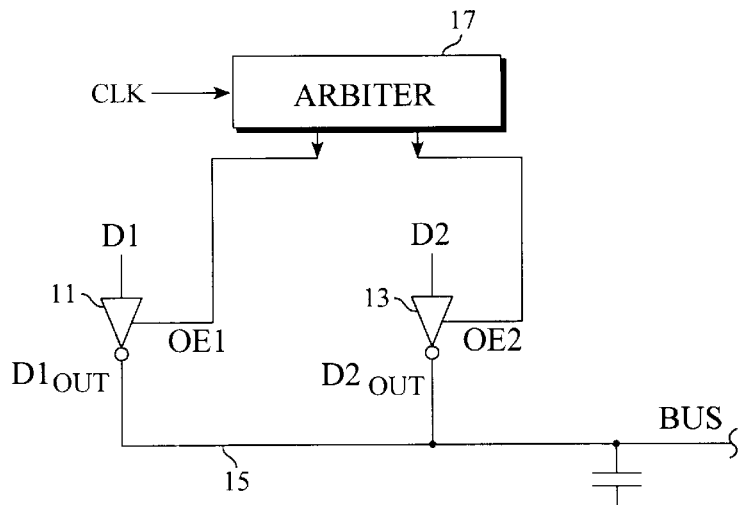
FIG. 1 is a block-level schematic diagram of a system of driver circuits connected to a bus.
Figure 4:
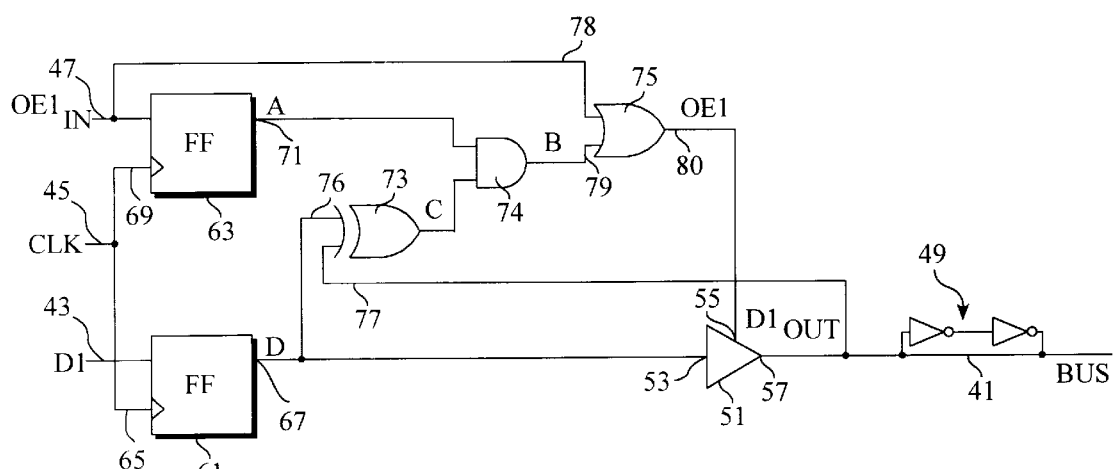
FIG. 4 is a gate-level schematic diagram of an improved driver circuit of the present invention for use in a system like FIG. 1.
Figure 2A:
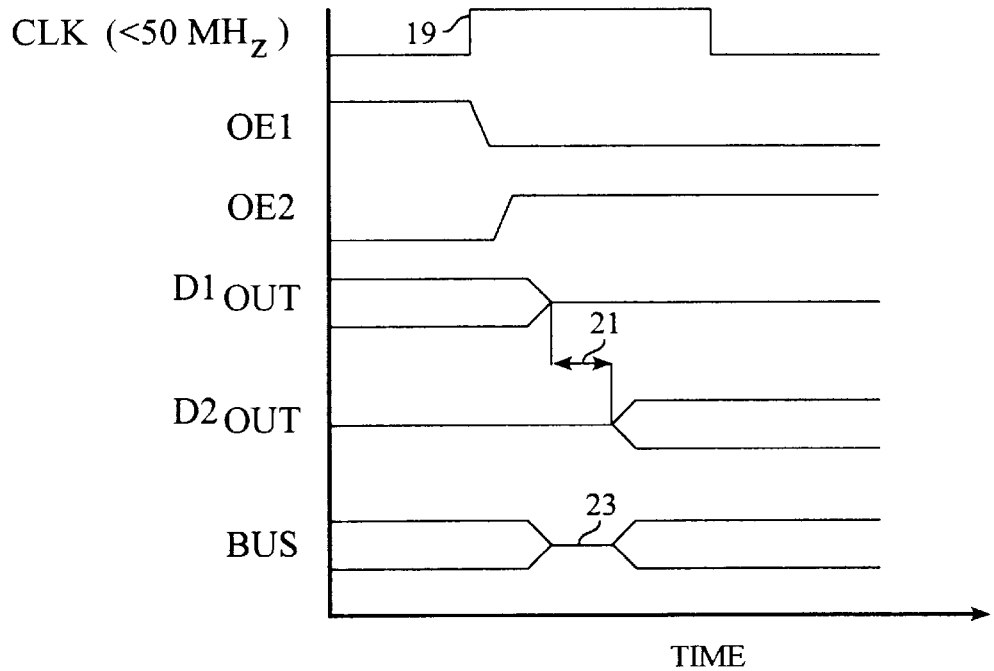
FIG. 2A and 2B are timing diagrams of various signals CLK, OE1, OE2, $D1_{out}$, $D2_{out}$ and BUS versus time for the system of FIG. 1 according to a first operation of the arbiter of the system, illustrating bus conflicts that can occur for higher clock rates (FIG. 2B).
Figure 2B:
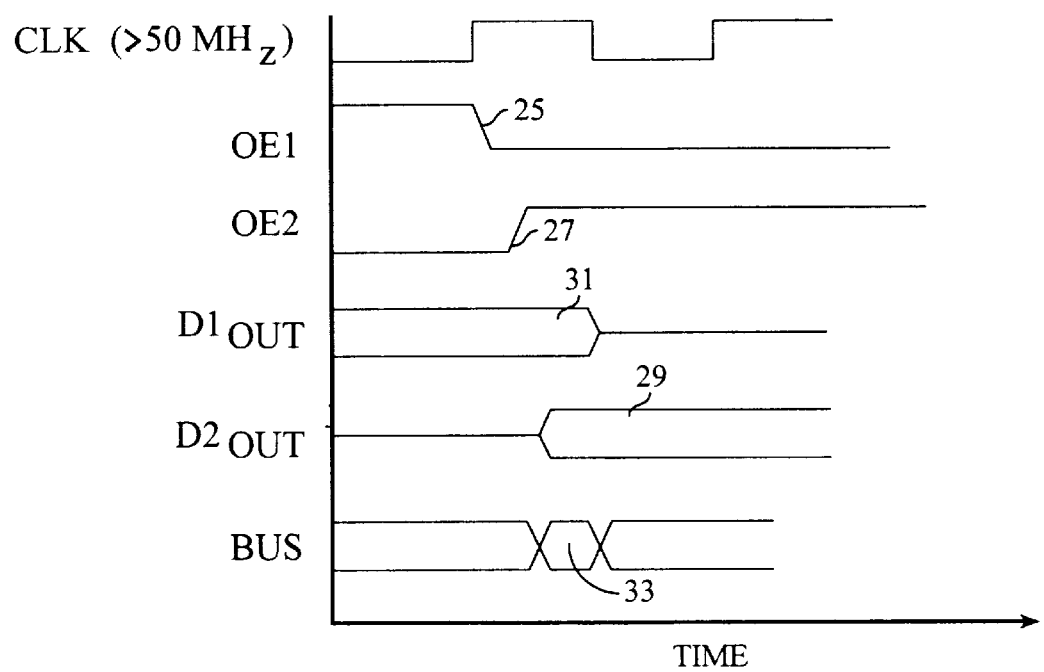
Figure 3:
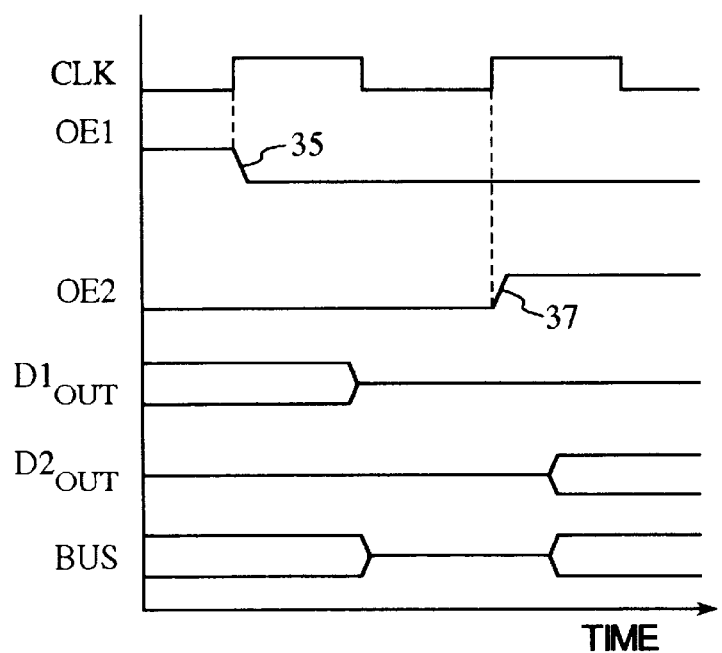
FIG. 3 is a timing diagram for the same signals as in FIGS. 2A and 2B versus time for the system of FIG. 1 according to a second operation of the arbiter, illustrating a conventional solution to the bus conflict problem.

With reference to FIG. 4, the driver circuit of the present invention is one of a plurality of drivers that can connect to a shared bus line 41 to provide a BUS signal thereon. As in FIG. 1, each such driver circuit has a data input 43 receiving data signals, e.g. D1, to be placed on the bus 41, and an output enable input 47 receiving an output enable control signal, e.g. $OE1_{in}$, from an arbiter circuit. The system clock signal CLK is provided not only to the arbiter as in FIG. 1, but also is provided to the driver circuit along with the data signals D1 and output enable signal $OE1_{in}$. Other driver circuits connected to the bus 41 receive the same clock signal CLK but distinct data and different output enable input signals $OE2_{in}$, etc. from the arbiter. The bus line 41 has a weak latch element 49, such as a pair of inverters, to hold the last received data value on the bus during those intervals when all drivers are inactive.

The driver circuit includes a conventional tri-state driver element 51 having a data input 53, an enable input 55, and a data output 57. The data output 57 is connected to the bus 41. As is typical of tri-state drivers, the driver element 51 provides data $D1_{out}$ on its output 57 received from its data input 53 whenever the enable input 55 receives a control signal of a first state (e.g., high). But when the control signal received at the enable input 55 is in a second state (e.g., low), the driver element 51 is inactive and there is high impedance between the input 53 and output 57. Generally, tri-state drivers like driver element 51 comprise an MOS pull-up transistor for connecting the output to a power supply voltage line, an MOS pull-down transistor for connecting the output to a ground line, with the gates of the MOS pull-up and pull-down transistors being coupled to the data input, and a pair of isolation transistors responsive to the control signal on the enable input for cutting off the output from the power supply voltage and ground lines whenever the control signal is in its second state (e.g., low). A variety of basically similar driver elements are well known in the art, and any of them can be used for the driver element 51 of FIG. 4. The present invention is directed to the provision of combinatorial logic deriving the control signal for the driver element's enable input 55 from the overall driver circuit's output enable signal input $OE1_{in}$ provided by an arbiter circuit and from feedback from driver element's output 57, so as to obtain early release of the driver circuit, and does not depend on the details of the particular implementation of the driver element 51.

The driver circuit of FIG. 4 further comprises a pair of flip-flop registers 61 and 63. A first flip-flop 61 has a data input 43 receiving an input data signal D1, a clock input 65 receiving a system clock CLK, and a data output 67 connected to the input 53 of the driver element 51. Changes in the input data signal D1 will only appear as a corresponding signal D at the flip-flop's output 67 when the clock signal CLK transitions high. A second flip-flop 63 has an input 47 receiving an enable signal $OE1_{in}$, a clock input 69 receiving the system clock CLK, and an output 71.

The combinatorial logic for the driver circuit of FIG. 4 includes a set of logic gates 73–75 with at least one of the gate's inputs receiving feedback from the driver element's output 57 and at least one other input receiving the data signal D that is also sent to the driver element's data input 53, so that the combinatorial logic as a whole is responsive not only to the enable signal $OE1_{in}$ but also to any difference between the driver element's data input and output signal values, to generate a control signal OE1 for the driver element's enable input 55 that produces early release of the driver prior to the end of its last clock cycle. In a preferred implementation of this logic, the gates include an XOR gate 73 having a first input 76 connected to the output 67 of the first flip-flop, a second input 77 connected to the output 57 of the driver element 51, and an output providing an output signal C. This feedback line 77 either can be directly connected to the gate 73 as shown or, alternatively, can be connected to the gate through a receiver. An AND gate 74 has inputs connected to the output 71 of the second flip-flop 63 and to the output of the XOR gate 73 to receive the respective signals A and C therefrom, and has an output providing a signal B. An OR gate 75 has a first input 78 connected to the input 47 to receive the enable signal $OE1_{in}$, a second input 79 connected to the output of the AND gate 74 to receive the signal B, and an output 80 connected to the driver element's enable input 55 so as to provide a control signal OE1 to the driver element 51.

Figure 5:
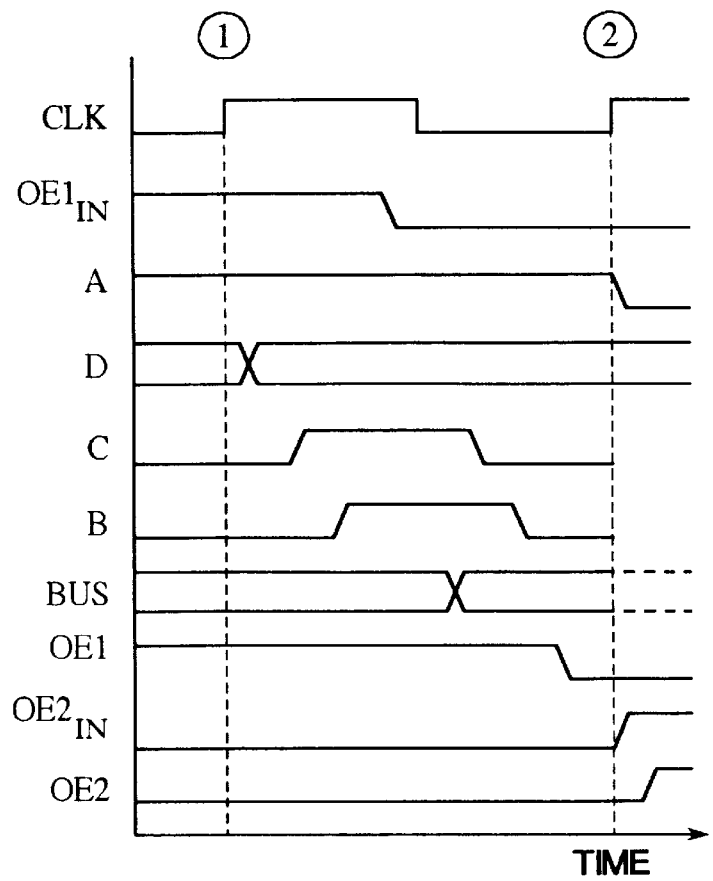
FIG. 5 is a timing diagram of various signals versus time illustrating the operation of the driver circuit of FIG. 4.

FIG. 5 illustrates the operation of the driver circuit of FIG. 4 with particular attention being given to the combinatorial logic inputs and outputs. A first clock cycle under consideration begins at the rising edge of the clock signal CLK at time 1 and ends at the next rising edge of CLK at time 2, which also forms the beginning of a second clock cycle. It is intended that a first driver circuit, like that in FIG. 4, will turn off by the end of the first clock cycle so that a second driver circuit, also like that in FIG. 4, can turn on at the beginning of the second clock cycle. That is, the first clock cycle is the last cycle for the first driver circuit and the second clock cycle is the first cycle for the second driver circuit. The enable input signal $OE1_{in}$ received by the first driver circuit is switched off early prior to the end of the first clock cycle, instead of at time 2, even though the driver element 51 may need to remain active during most of that last clock cycle to place a final data bit onto the bus 41. The combinatorial logic gates 73–75 serve to maintain this active state of the driver element 51 long enough for that final driving of the bus by the first drive circuit to occur. Note that no wait state of one clock cycle is required. In order to keep driver element 51 active, its control signal input OE1 must remain high even after $OE_{in}$ has fallen low. Since $OE1_{in}$ provides one signal input to OR gate 75, this means that the driver element 51 stays active after $OE1_{in}$ has fallen low only as long as the logic signal output B from the AND gate 74 remains high.

The first flip-flop 61 responsive to the clock signal CLK provides data D on its output to both an input 76 to XOR gate 73 and also to the input 53 of driver element 51, which then places it onto the bus 41. The data D1 supplied to the input 43 of the flip-flop 61 may change at any time but will only be output by the flip-flop 61 as data D at the beginning of a subsequent clock cycle. There is also some delay between being output by the flip-flop and the data $D1_{out}$ being completely placed into the bus 41, due primarily to RC delay from the capacitance of the bus. Thus, until the pull up or pull down of the bus by the driver element 51 has been completed, the input and output side of the driver element 51 will differ (unless the data bit is the same as the previous bit, in which case no pull up or pull down action is required). The XOR gate 73, with its second input 77 received from the output side of the driver element 51, compares the desired data value D with the actual bus value $D1_{out}$ and outputs a comparison result C. The signal C output from the XOR gate 73 remains high until the driver's output 57 has a value which is the same as the desired value D and then goes low to signal that the driver's action has been completed. The signals A and C are input to AND gate 74 to generate the signal B. Signal A, which is the output of flip-flop 63 maintains the last received output enable signal $OE1_{in}$ until the end of the clock cycle. Its purpose is primarily to keep any differences between the state of data D and of the bus from enabling the driver when some other driver is active. (Signal A is always low when another driver is active.) After the output B of AND gate 74 goes low, the enable signal OE1 likewise goes low and deactivates the driver element 51. The weak latch 49 maintains the state of the bus (represented in the figure by the dashed lines for the signal BUS) until another driver activates. When the second driver's output enable input $OE2_{in}$ goes high at the start of the second clock cycle at time 2, an OR gate, like OR gate 75, for that second driver pulls the corresponding enable signal OE2 high and activates the second driver's driver element.

Thus, the driver circuit of the present invention allows transfers of bus driving activity from one driver circuit to another without conflicts that would result from simultaneous partially active drivers, but without requiring a one clock cycle wait state between deactivation of one driver and activation of a subsequent driver. This achievement has been produced by combinatorial logic in the driver circuits that cause early release of the active driver during its last active clock cycle, so that immediately upon the start of the next clock cycle the next driver circuit can be activated.

What is claimed is:

1. A driver circuit, comprising:
   a tri-state driver having an enable input and a data input, and having a data output connected to a bus, said driver providing data from said data input to said data output whenever said enable input receives a control signal of a first state, said driver being inactive whenever said control signal is of a second state;
   logic means receiving a data signal input, an enable signal input, a clock input and a feedback input connected to said data output of said tri-state driver, for generating a control signal maintaining said tri-state driver in an active state for a final clock cycle after said enable signal input switches to an inactive state until said data input to said tri-state driver and said feedback input are of identical states; and
   a weak bus-hold latch connected to said bus.

2. The driver circuit of claim 1, wherein said logic means includes:
   a first flip-flop having a data input and a data output, and having a clock input receiving a clock signal, said data output of said first flip-flop connected to said data input of said tri-state driver;
   a second flip-flop having an input receiving an enable signal, a clock input receiving said clock signal, and an output;
   an XOR gate having a first input connected to said data output of said first flip-flop, a second input connected to said data output of said driver, and an output;
   an AND gate having a first input connected to said output of said second flip-flop, a second input connected to said output of said XOR gate, and an output; and
   an OR gate having a first input receiving said enable signal, a second input connected to said output of said AND gate, and an output connected to said enable input of said driver and providing said control signal thereto.

3. A driver circuit, comprising:
   a tri-state driver having an enable input and a data input, and having a data output connected to a bus, said driver providing data from said data input to said data output whenever said enable input receives a control signal of a first state, said driver being inactive whenever said control signal is of a second state;
   a first flip-flop having a data input and a data output, and having a clock input receiving a clock signal, said data output of said first flip-flop connected to said data input of said tri-state driver;
   a second flip-flop having an input receiving an enable signal, a clock input receiving said clock signal, and an output;
   an XOR gate having a first input connected to said data output of said first flip-flop, a second input connected to said data output of said driver, and an output;
   an AND gate having a first input connected to said output of said second flip-flop, a second input connected to said output of said XOR gate, and an output;
   an OR gate having a first input receiving said enable signal, a second input connected to said output of said AND gate, and an output connected to said enable input of said driver and providing said control signal thereto; and
   a weak bus-hold latch connected to said bus.

4. A system of driver circuits, all connected to a shared bus, for placing data onto said bus by at most one driver circuit at a time, the system comprising:
   a plurality of driver circuits, each driver circuit having a data input, a clock input, an enable signal input, and a data output, the data input being connected to a source of data to be placed onto said bus, the clock input connected to receive a system clock signal, and the data output being connected to the bus;
   an arbiter circuit having a clock input connected to receive said system clock signal and a set of enable signal outputs connected to the respective enable signal inputs of each of said plurality of driver circuits to provide enable signals thereto, only one enable signal being active at any one time, an active enable signal becoming inactive one clock cycle prior to another enable signal becoming active; and
   a weak bus-hold latch connected to said bus;
   wherein each of said driver circuits includes a tri-state driver element having a data input receiving data from the data input of the driver circuit, an enable input, and a data output forming the data output of the driver circuit for providing data onto said bus, and wherein each of said driver circuits further includes logic means having inputs connecting to the data input of said tri-state driver element, the data output of said tri-state driver element, the clock input of the driver circuit, and the enable signal input of the driver circuit, and having an output connected to the enable input of said tri-state driver element, said logic means for generating a control signal on its output maintaining said tri-state driver element in an active state for a final clock cycle after said enable signal input to the driver circuit switches to an active state until said data input and data output of said tri-state driver element are of identical states.

5. The system of claim 4, wherein said logic means includes:
- a first flip-flop having a data input and a data output, and having a clock input receiving a clock signal, said data output of said first flip-flop connected to said data input of said tri-state driver;
- a second flip-flop having an input receiving an enable signal, a clock input receiving said clock signal, and an output;
- an XOR gate having a first input connected to said data output of said first flip-flop, a second input connected to said data output of said driver, and an output;
- an AND gate having a first input connected to said output of said second flip-flop, a second input connected to said output of said XOR gate, and an output; and
- an OR gate having a first input receiving said enable signal, a second input connected to said output of said AND gate, and an output connected to said enable input of said driver and providing said control signal thereto.

* * * * *